United States Patent
Antar et al.

(10) Patent No.: US 10,403,113 B1
(45) Date of Patent: Sep. 3, 2019

(54) METHODS FOR WARNING OF ELECTROMAGNETIC FIELDS PRODUCED BY WIRELESS ELECTRIC VEHICLE CHARGING SYSTEMS

(71) Applicant: WiTricity Corporation, Watertown, MA (US)

(72) Inventors: Michael Antar, San Diego, CA (US); Ryan Mills, Santee, CA (US); Fang Han, San Diego, CA (US); Mei-Li Chi, San Diego, CA (US); William Von Novak, III, San Diego, CA (US)

(73) Assignee: Witricity Corpoation, Watertown, MA (US)

( * ) Notice: Subject to any disclaimer, the term of this patent is extended or adjusted under 35 U.S.C. 154(b) by 131 days.

(21) Appl. No.: 15/946,743

(22) Filed: Apr. 6, 2018

(51) Int. Cl.
*G08B 17/12* (2006.01)
*G08B 21/02* (2006.01)
*G01V 3/10* (2006.01)
*G01V 3/08* (2006.01)
*B60L 53/12* (2019.01)
*B60L 53/31* (2019.01)

(52) U.S. Cl.
CPC .............. *G08B 21/02* (2013.01); *B60L 53/12* (2019.02); *B60L 53/31* (2019.02); *G01V 3/081* (2013.01); *G01V 3/10* (2013.01); *B60L 2250/10* (2013.01)

(58) Field of Classification Search
CPC ........ G08B 21/02; G08B 21/18; G08B 17/12; G08B 21/182; B60L 11/1825; B60L 11/182; B60L 2250/10; B60L 2250/16; B60L 2240/72; G01V 3/081; G01V 3/10

USPC .............. 340/600, 573.1, 455, 636.1, 539.11
See application file for complete search history.

(56) References Cited

U.S. PATENT DOCUMENTS

| | | | |
|---|---|---|---|
| 8,188,868 B2 * | 5/2012 | Case, Jr. ................. | A41D 1/002 340/573.1 |
| 2006/0049943 A1 * | 3/2006 | Sakashita ............... | G01V 15/00 340/572.1 |
| 2011/0057606 A1 | 3/2011 | Saunamaeki | |
| 2011/0074346 A1 | 3/2011 | Hall et al. | |
| 2012/0001751 A1 * | 1/2012 | Baker ................... | H04W 76/10 340/539.12 |
| 2013/0106346 A1 | 5/2013 | Salter et al. | |
| 2016/0114687 A1 * | 4/2016 | Ichikawa ............... | B60L 5/005 701/22 |

(Continued)

OTHER PUBLICATIONS

Wen F., et al., "Human Exposure to Electromagnetic Fields from Parallel Wireless Power Transfer Systems", International Journal of Environmental Research and Public Health, PMCID: PMC5334711, 2017, pp. 1-12.

*Primary Examiner* — Anh V La
(74) *Attorney, Agent, or Firm* — Hunter Clark PLLC

(57) ABSTRACT

Techniques for detecting the presence of a magnetic field associated with a wireless electric vehicle charging (WEVC) system are disclosed. An example of an apparatus for alerting a user of the presence of a magnetic field according to the disclosure includes a mobile device and at least one magnetic flux sensor integrated as part of the mobile device or operably coupled to the mobile device, the at least one magnetic flux sensor configured to detect the presence of the magnetic field associated with a wireless electric vehicle charging system, the mobile device configured to generate an alert based on the presence of the magnetic field detected by the at least one magnetic flux sensor.

24 Claims, 14 Drawing Sheets

(56) References Cited

U.S. PATENT DOCUMENTS

| | | |
|---|---|---|
| 2017/0033616 A1 | 2/2017 | Ludwig et al. |
| 2017/0230743 A1* | 8/2017 | Lee .................... H04R 1/1041 |
| 2017/0315162 A1* | 11/2017 | Ambrosio ............ G01R 15/207 |
| 2018/0034509 A1* | 2/2018 | Nakano .................. H02J 5/005 |
| 2018/0164350 A1* | 6/2018 | Thompson ........... G01R 19/155 |

* cited by examiner

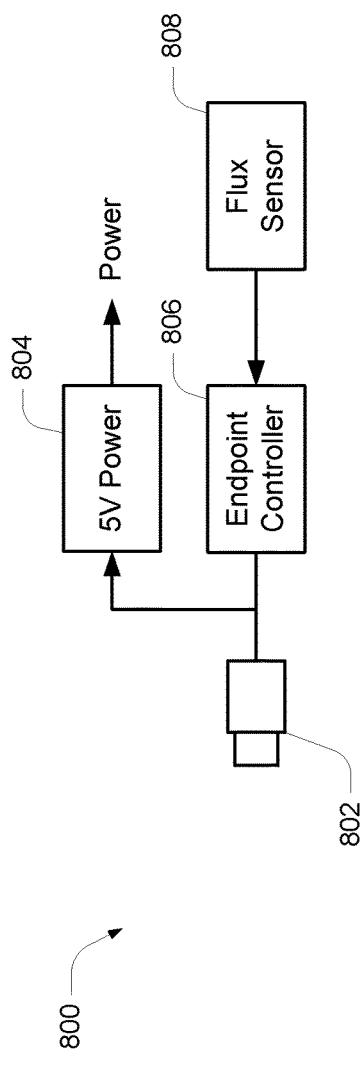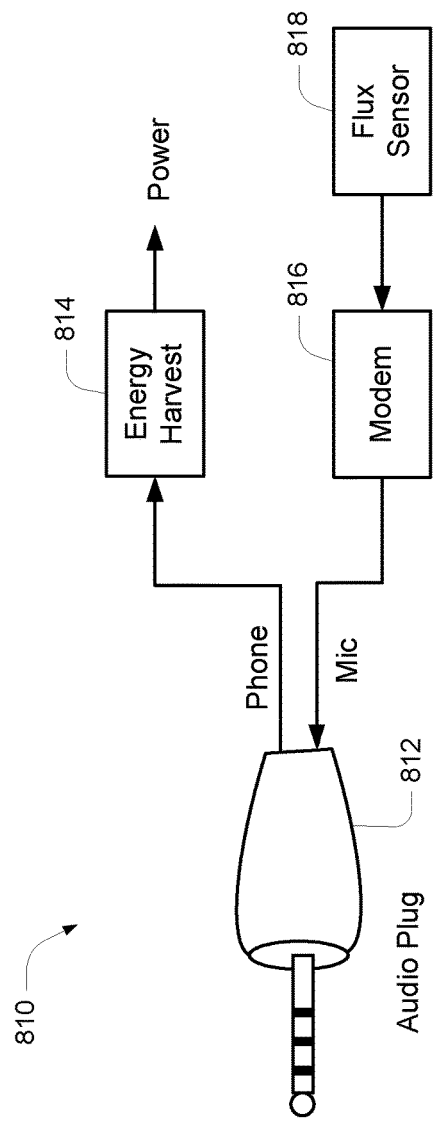
FIG. 8A
FIG. 8B

METHODS FOR WARNING OF ELECTROMAGNETIC FIELDS PRODUCED BY WIRELESS ELECTRIC VEHICLE CHARGING SYSTEMS

FIELD

This application is generally related to wireless power charging of chargeable devices such as electric vehicles, and more specifically to systems and methods for identifying, locating and warning of the presence of strong electromagnetic fields.

BACKGROUND

Chargeable systems, such as vehicles, have been introduced that include locomotion power derived from electricity received from an energy storage device such as a battery. Vehicles that are solely electric generally receive the electricity for charging the batteries from other sources. Battery electric vehicles are often proposed to be charged through some type of wireless charging system that is capable of transferring power in free space (e.g., via a wireless field). Some such systems may provide wireless power to the vehicle while the vehicle is located on the roadway, in motion or stationary. During charging operations, a wireless charging system may generate a strong electromagnetic field which is invisible and undetectable to humans and animals. Emissions from these fields may be dangerous if they exceed defined safe limits. In particular, the presence of a strong electromagnetic field at certain close distances may cause some implantable medical devices to malfunction and potentially injure the user. Many of these charging systems may be installed in public spaces and it may be useful for users of certain devices to be aware of the presence of these charging systems. Thus, there is a need to identify active electromagnetic fields and to provide notifications to users to allow precautions to be taken.

SUMMARY

An example of an apparatus for alerting a user of the presence of a magnetic field according to the disclosure includes a mobile device and at least one magnetic flux sensor integrated as part of the mobile device or operably coupled to the mobile device, the at least one magnetic flux sensor configured to detect the presence of the magnetic field associated with a wireless electric vehicle charging system, the mobile device configured to generate an alert based on the presence of the magnetic field detected by the at least one magnetic flux sensor.

Implementations of such an apparatus may include one or more of the following features. The at least one magnetic flux sensor may be configured to detect the presence of the magnetic field based on a frequency associated with the wireless electric vehicle charging system. The frequency associated with the wireless electric vehicle charging system may be in a range of 70-120 kHz. The at least one magnetic flux sensor may include a coil in a mobile device charging system configured to receive wireless power for charging the mobile device. The at least one magnetic flux sensor may include a coil in the mobile device configured for near field communications. The mobile device may be an implantable medical device. The mobile device may include a display device configured to provide an indication based on the alert. The mobile device includes a speaker and the alert includes generating an audible alarm with the speaker. The mobile device may include a transceiver and the alert may include transmitting a radio message via a radio message protocol with the transceiver. The radio message may be configured to cause the wireless electric vehicle charging system to reduce the magnetic field detected by the at least one magnetic flux sensor. The at least one magnetic flux sensor may include a plurality of loops configured to determine the presence of the magnetic field regardless of an orientation of the at least one magnetic flux sensor relative to an orientation of the magnetic field. The at least one magnetic flux sensor may be configured to determine a bearing to a source of the magnetic field based the plurality of loops. The mobile device may include a positioning module configured to determine a current position of the mobile device, the mobile device may be configured to activate the at least one magnetic flux sensor based on the current position of the mobile device. The mobile device may include an audio jack and the at least one magnetic flux sensor is operably coupled to the audio jack. The mobile device may include a universal serial bus port and the at least one magnetic flux sensor is operably coupled to the universal serial bus port. The mobile device may be a smartphone.

An example of a method of detecting an active base charging pad in a wireless electric vehicle charging system according to the disclosure includes detecting a presence of a magnetic field associated with the wireless electric vehicle charging system at a mobile device separate from the wireless electric vehicle charging system, and generating an alert based on detecting the presence of the magnetic field associated with the wireless electric vehicle charging system.

Implementations of such a method may include one or more of the following features. Detecting the presence of the magnetic field may include measuring a signal on a resonant charging coil in the mobile device. Detecting the magnetic field may include measuring a signal on a near field communication coil in the mobile device. Detecting the magnetic field may include measuring a signal on a resonant charging coil in an implantable medical device. The method may include determining a field characteristic of the magnetic field. Determining the field characteristic of the magnetic field may include determining a strength of the magnetic field. Determining the field characteristic of the magnetic field may include determining a frequency of the magnetic field. Determining the field characteristic of the magnetic field may include determining an identification value based on an in-band signal modulated with the magnetic field. Generating the alert may include transmitting a radio message to the wireless electric vehicle charging system via a radio message protocol. The method may further include receiving location information associated with the wireless electric vehicle charging system from a location server, and providing the field characteristic to the location server.

An example of an apparatus for detecting an active base charging pad in a wireless electric vehicle charging system according to the disclosure includes a resonant circuit including at least one detection coil configured to resonate at a frequency of a magnetic field associated with the wireless electric vehicle charging system, a rectifier circuit operably coupled to the at least one detection coil, and a transmitter operably coupled to the rectifier circuit and configured to transmit a radio message based on a voltage across the at least one detection coil.

Implementations of such an apparatus may include one or more of the following features. The at least one detection coil, the rectifier circuit, and the transmitter may be disposed in an article of clothing to be worn by a user. The resonant circuit including the at least one detection coil, the rectifier circuit, and the transmitter may be disposed in an implanted medical device. The resonant circuit including the at least one detection coil, the rectifier circuit, and the transmitter may be disposed in a smart phone or operably connected to the smart phone.

Items and/or techniques described herein may provide one or more of the following capabilities, as well as other capabilities not mentioned. A wireless electric vehicle charging (WEVC) system may energize a base pad. A strong magnetic field may be emitted from the active base pad. A Foreign Object Detection (FOD) system or a Living Object Protection (LOP) system may also emit a strong magnetic field. A magnetic field detection circuit may be used to detect one or more magnetic fields. Loop structures within a mobile device may be used to detect the magnetic fields. Peripheral detectors may be operably coupled to a mobile device. An implantable medical device may include one or more detection loops. An alert may be generated based on the detection of a magnetic field. The alert may be used to notify a user of a proximate magnetic field. The alert may include commands configured to reduce the power to a base pad. A bearing to the active base pad from the mobile device may be determined. Base pad information and detection information may be exchanged between the mobile device and a remote server. The remote server may be configured to collect and disseminate detection information from multiple mobile devices. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

FIGS. 8A and 8B are block diagrams of flux sensors configured as peripheral devices.

DETAILED DESCRIPTION

Figure 1:
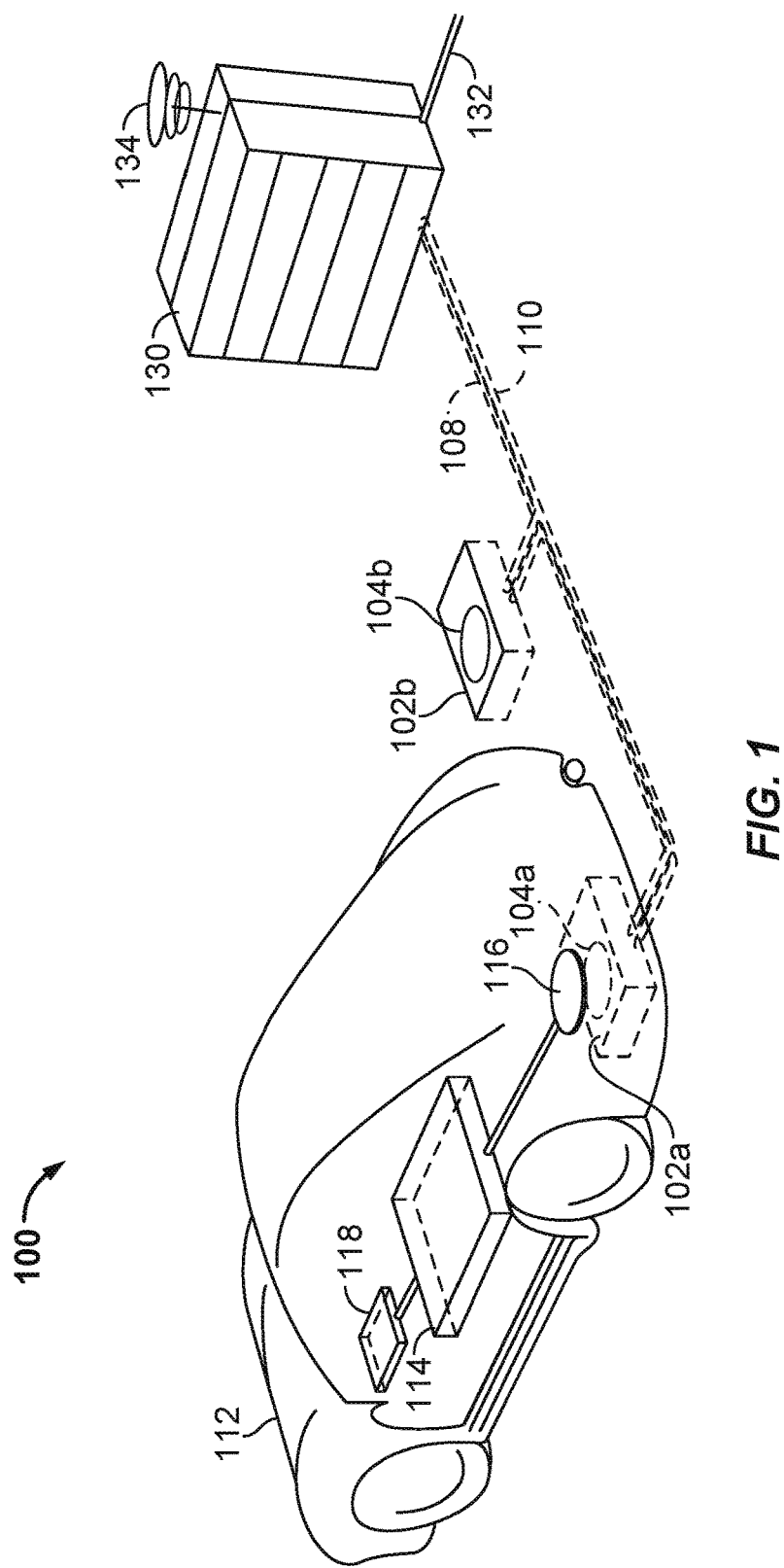
FIG. 1 is a diagram of an exemplary wireless power transfer system for charging an electric vehicle.

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

The systems, devices, and methods described herein may be configured to identify the presence of Wireless Electric Vehicle Charging (WEVC) produced magnetic fields and inform users and susceptible devices of the relative location of the magnetic fields (e.g., this may be associated with magnetic fields at lower frequencies such as those in the kHz range—such as around 70-120 kHz). In one embodiment, a WEVC system may be configured to provide visible/audible warnings and machine-to-machine (M2M) wireless technology (e.g., BLUETOOTH (BT), BTLE, WiFi, 3G, 4G, LTE) to communicate with nearby devices such as smartphones, Implantable Medical Devices (IMD), wearable devices, pet collars, other vehicles, etc. For example, a WEVC system may be configured to utilize BT or BTLE beaconing to indicate its location and charging state to devices within range. The WEVC system may be configured to send out location and charge state information using WiFi or cellular (e.g., WMTS band) to one or more mobile devices registered in a networked database. In an embodiment, a mobile device may be configured to detect a nearby electromagnetic field. For example, internal coils (e.g., wireless charging, near field communication), internal sensors (e.g., magnetometers, Hall Effect sensors) or external sensors (e.g., attached as a peripheral to a mobile device) may be used to detect the presence of a magnetic field. The mobile device may be configured to generate one or more notifications based on signals generated by the internal or external sensors. The notifications may be audio or visual, or other electronic signaling such as sending a signal to another device.

Referring to FIG. 1, a diagram of an exemplary wireless power transfer system 100 for charging an electric vehicle 112 is shown. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. The second wireless charging system 102b includes a second base system induction coil 104b. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below. Local distribution 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment. These areas may correspond to population centers and thus there is a potential that pedestrians may be exposed to the magnetic fields generated by the wireless charging system 102a.

In general, charging electric vehicles wirelessly may provide numerous benefits which outweigh the risks. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

Figure 2:
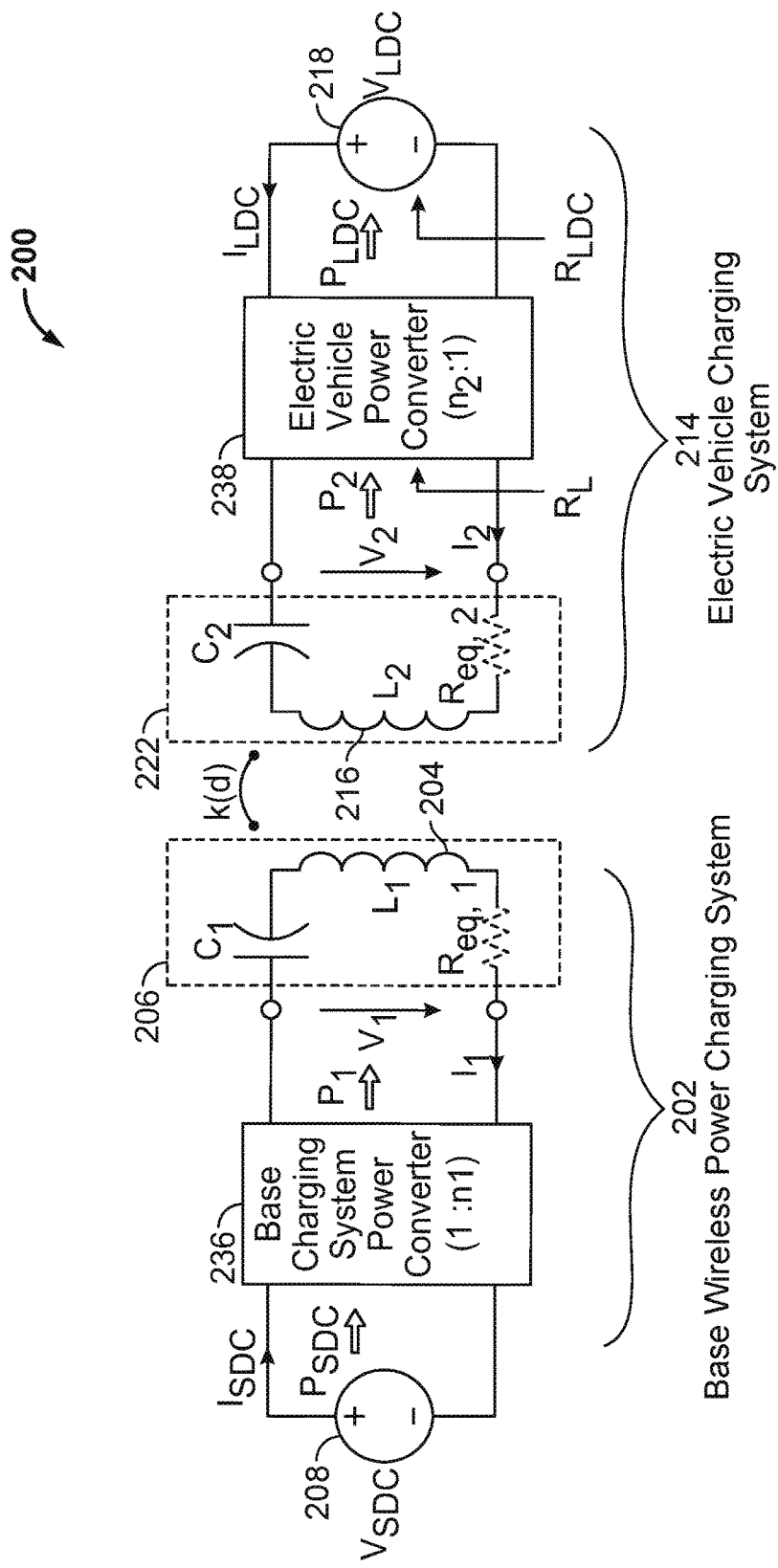
FIG. 2 is a schematic diagram of exemplary core components of the wireless power transfer system of FIG. 1.

Referring to FIG. 2, a schematic diagram of exemplary core components of the wireless power transfer system 100 of FIG. 1 is shown. The wireless power transfer system 200 may include a base system transmit circuit 206 including a base system induction coil 204 having an inductance L1. The wireless power transfer system 200 further includes an electric vehicle receive circuit 222 including an electric vehicle induction coil 216 having an inductance $L\neg 2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

A power supply 208 (e.g., AC or DC) supplies power PSDC to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power P1 to the base system transmit circuit 206 including the capacitor C1 in series with the base system induction coil 204 to emit an electromagnetic field at a desired frequency. The capacitor C1 may be provided to form a resonant circuit with the base system induction coil 204 that resonates at a desired frequency. The base system induction coil 204 receives the power P1 and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor C2 and electric vehicle induction coil 116. The capacitor C2 may be provided to form a resonant circuit with the electric vehicle induction coil 216 that resonates at a desired frequency. Element k(d) represents the mutual coupling coefficient resulting at coil separation. Equivalent resistances Req,1 and Req,2 represent the losses that may be inherent to the induction coils and 216 and the anti-reactance capacitors C1 and C2. The electric vehicle receive circuit 222 including the electric vehicle induction coil 316 and capacitor C2 receives power P2 and provides the power P2 to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power PLDC to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle wireless charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle wireless charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling. The coils may be litz wire.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. Inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high native quality (Q) factor to lower the losses of the induction coil and to increase efficiency of the inductive coupling system.

Figure 3:
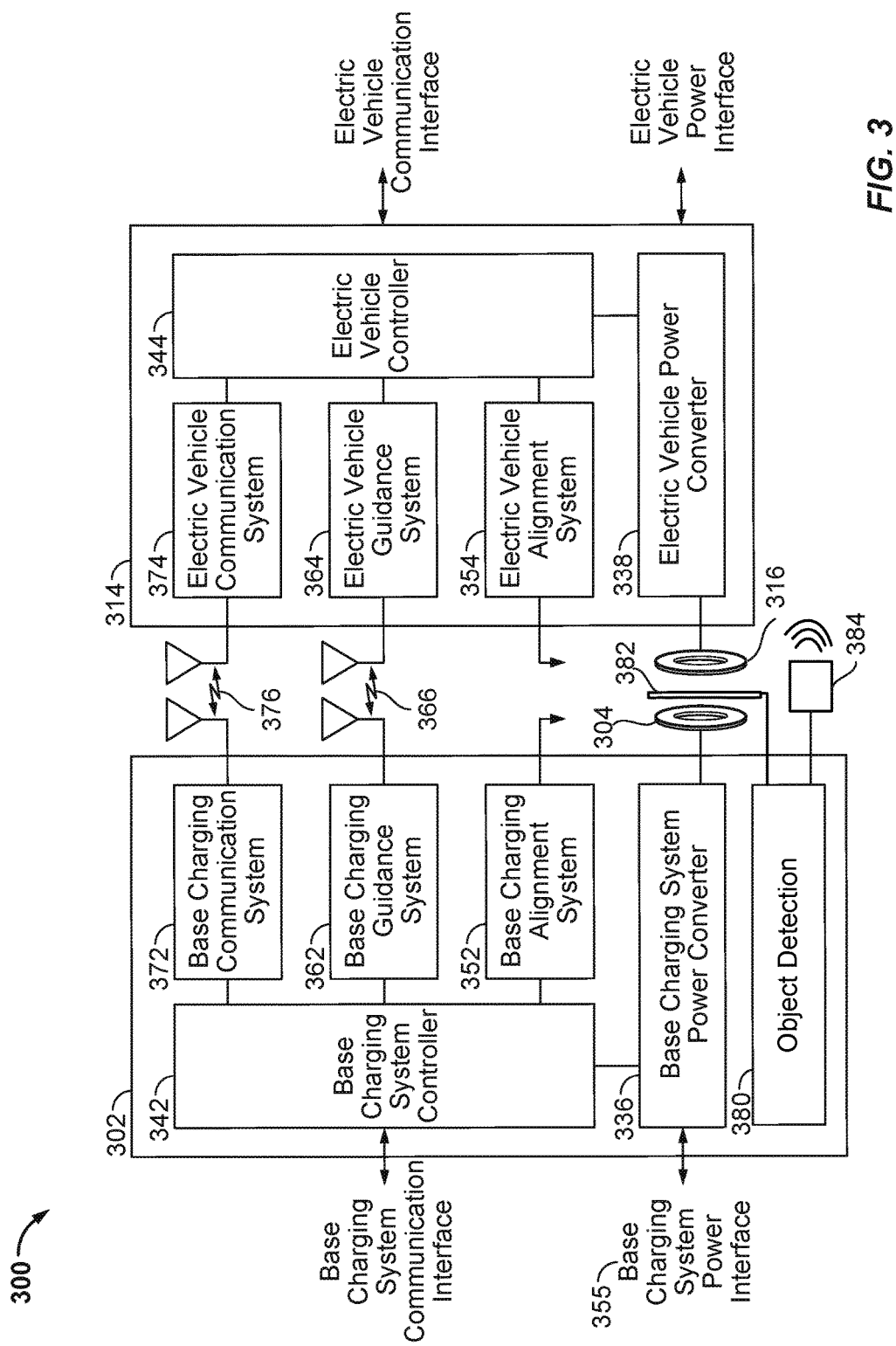
FIG. 3 is another functional block diagram showing exemplary core and ancillary components of the wireless power transfer system of FIG. 1.

Referring to FIG. 3, another functional block diagram showing exemplary core and ancillary components of the wireless power transfer system 300 of FIG. 1 is shown. The wireless power transfer system 300 illustrates a object detection controller 380, a communication link 376, a guidance link 366, and alignment systems 352, 354 for the base system induction coil 304 and electric vehicle induction coil 316. In an example, the power transfer system 300 may include a pairing device (not shown in FIG. 3) to certify the matching of the transmitting entity and the receiving entity of alignment and guidance. As described above with reference to FIG. 2, and assuming energy flow towards the electric vehicle 112, in FIG. 3 a base charging system power interface 355 may be configured to provide power to a base charging system power converter 336 from a power source, such as an AC or DC power supply. The base charging system power converter 336 may receive AC or DC power from the base charging system power interface 355 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface to other systems (not shown) such as a smartphone, a computer, and a power distribution center, or a smart power grid. The base charging system controller 342 may be configured to exchange M2M messages with other devices. For example, the based charging system controller 342 may be configured to send beacon or other messages to a smart phone to indicate the location and status of the wireless power transfer system 300. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. The base charging system controller 342 may be operably coupled to an object detection controller 380 configured to control a foreign object detection (FOD) system 382 and a living object protection (LOP) system 384. In addition, there may be separate general-purpose communication links (e.g., channels) supported by base charging communication system 372 and electric vehicle communication system 374 for communicating other information between the base wireless charging system 302 and the electric vehicle charging system 314. Other devices such as smartphones and field detection systems may communicate with the base charging system 302 via the base charging communication system 372. This information may include information about electric vehicle characteristics, battery characteristics, charging status, and power capabilities of both the base wireless charging system 302 and the electric vehicle charging system 314, foreign object detection, living object protection information, as well as maintenance and diagnostic data for the electric vehicle 112. The base charging system controller 342 may also have a Human Machine Interface (HMI) to receive input from a user such as an indication that the charging area is free from foreign objects. An emergency off button may also be part of the interface. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle wireless charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 includes detection and sensor systems for use with systems to properly guide the driver or the vehicle to the charging spot and sensors to mutually align the induction coils with the required separation/coupling. The LOP system 384 includes sensors to detect objects that may obstruct the electric vehicle induction coil 316 from moving to a particular height and/or position to achieve coupling, and safety sensors for use with systems to perform a reliable, damage free, and safe operation of the system. For example, the LOP system 384 may include a sensor for detection of presence of animals or children approaching the wireless power induction coils 104a, 116 beyond a safety radius. The FOD system 382 is configured to detect foreign metal objects near the base system induction coil 304 that may be heated up (induction heating). In some charging systems, the LOP and FOD systems may generate strong magnetic fields which may be detected by the methods described herein. Other sensors may be used for the detection of hazardous events such as incandescent objects on the base system induction coil 304, and temperature monitoring of the base wireless charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-150 kHz and particularly in the range from 80-90 kHz. This low frequency coupling may allow highly efficient power conversion that may be achieved using solid state devices. In addition, there may be less coexistence issues with radio systems compared to other bands.

Figure 4:
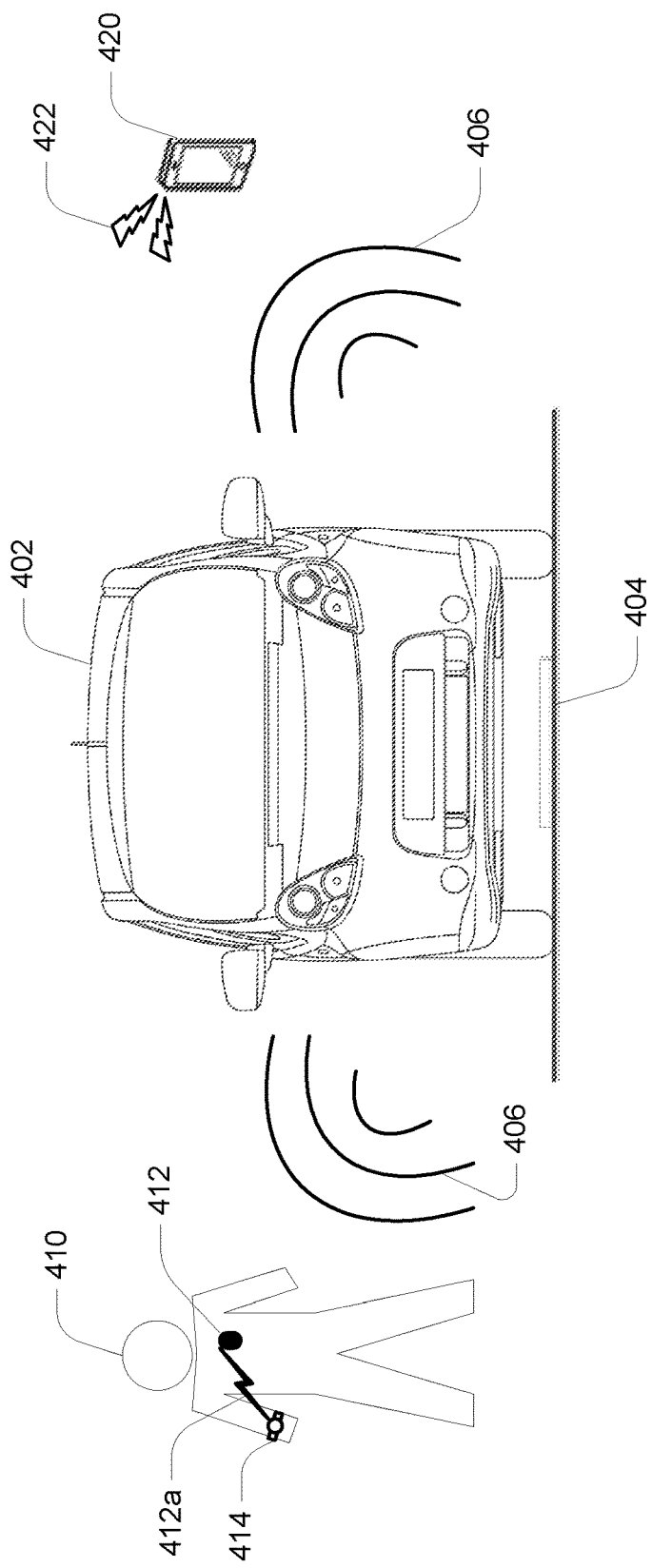
FIG. 4 is an illustration of use cases for detecting an electromagnetic field.

Referring to FIG. 4, with further reference to FIGS. 1-3, example use cases for detecting an electromagnetic field are shown. An electric vehicle 402 may be parked over one or more coils 404 (e.g., such as the wireless power induction coil 104 in the base wireless charging system 102 in FIG. 1). During charging operations, the coils 404 generate an electromagnetic field 406 (e.g., primarily magnetic field portion). In an example, the coils 404 may be configured to generate an electromagnetic field 406 at approximately 85 kHz for WEVC applications. The electromagnetic field 406 may be further varied based on in-band signal encoding techniques. In an embodiment, a user 410 may be medically dependent on an Implanted Medical Device (IMD) 412 (e.g., pacemaker, neuro-stimulator, cochlear implant, insulin pump, gastric stimulator, etc.). In many cases, the performance of such IMDs may be impacted by exposure to strong electromagnetic fields. The IMD 412 is configured to detect the presence of the electromagnetic field 406. In an example, the existing charging and/or Near Field Communication (NFC) coils in the IMD 412 may be configured to detect the electromagnetic field 406. Other coils and tuning circuits may be included in the IMD 412 and tuned to the expected standard WEVC charging frequencies, to harmonics of those charging frequencies, or to the frequencies associated with the FOD and/or LOP systems. Upon detecting the electromagnetic field 406, the IMD 412 may be configured to communicate directly with the WEVC system (e.g., via a base charging system communication interface) to inform the WEVC system of the presence of the user 410 and the IMD 412. The IMD 412 may utilize a communication link 412a with a personal electronic device 414 to notify the user 410 of the proximity of the electromagnetic field 406. The personal electronic device 414 may be a smart watch, fitness band, mobile phone, or other portable device configured to send and receive wireless communications. The personal electronic device 414 may be configured to emit an audible and/or visual notification. In an example, the personal electronic device 414 may receive a detection signal from the IMD 412 via the communication link 412a, and then communicate with the WEVC system to provide a notification regarding the proximity of the user 410 to the coil 404. In an embodiment, the personal electronic device 414 may communicate with the WEVC system in response to a beacon signal sent from the WEVC system regardless of the detection of the electromagnetic field 406 by the IMD 412. The WEVC system may be configured to reduce power output or reduce power to the FOD and LOP systems in response to a signal received from the electromagnetic field 406.

In another use case, a mobile device 420 may be configured to detect the electromagnetic field 406. The mobile device 420 may be a smart phone, tablet, sports band, shoe-based pedometer, pet collar, or other devices that may be worn or transported by a user. Upon detecting the field, the mobile device 420 is configured to generate a notification 422. The notification 422 may be an audible and/or visual signal. The notification 422 may include communications with the base charging system controller 342 configured to make the WEVC system aware of the presence of a user. The mobile device 420 may include a mobile device charging system with one or more resonant coils and corresponding tuning circuitry for wirelessly charging the mobile device. The mobile device may be configured to utilize an internal induction device or resonant charging coil in the wireless mobile device changing system and/or NFC coils to detect the electromagnetic field 406. Other sensors in the mobile device 420 such as built-in Hall Effect sensors and magnetometers (e.g., as used by a compass application) may also be used to detect a magnetic field. In operation, the mobile device 420 may be configured to implement a subsampling algorithm for the magnetometers (e.g., to have a sub 100 Hz sampling rate). The subsampling algorithm may be configured to operate at a non-even fraction of the original rate. As an example, the period of a 40 kHz WEVC signal is 25 us. A subsampling at exactly 100 Hz (10,000 us) will always read the same phase of the 40 kHz signal and thus see only a direct current (DC) value. In contrast, a subsampling at 99.99 Hz (10,001 us) will see a slowly varying AC signal that will make a one complete cycle after 25 samples at 99.99 Hz—this will appear as a signal at 3.9996 Hz (i.e., approximately 4 Hz). The presence of this approximately 4 Hz signal, at a 99.99 Hz sampling rate, may be used as an indication that there is a 40 khz fundamental present.

The magnetometers in the mobile device 420 may be spoofed by changing orientations. For example, if a user is running with a cellphone, such that it is seeing a periodic change on orientation of about 4 Hz, the signal may look very similar to the 4 Hz signal expected from the WEVC field. The mobile device 420 may be configured to validate that the 4 Hz signal is coming from a WEVC by changing the sampling rate, using signals from accelerometers, or combinations thereof. For example, the mobile device may change the sampling rate of the magnetometer (e.g., from 99.99 Hz to 99.98 Hz.). The recovered frequency should roughly double (e.g., +/−5%) to indicate the presence of a 40 KHz signal. If the recovered frequency does not roughly double, the cause of the 4 Hz signal is likely due to motion caused by the user. Similarly, the mobile device 420 may be configured to use accelerometers to detect motion. Accordingly, if the mobile device 420 is stationary, then the detected 4 Hz signal likely represents the 40 kHz signal.

In one embodiment, the mobile device 420 may be configured to measure the DC rectification in the magnetometers, wireless power receivers, and receivers such as microphone preamplifiers, which result from the presence of the electromagnetic field 406. For example, the conductors within the mobile device 420 may receive the electromagnetic field 406, and then parasitic structures within the integrated circuits (e.g., body diodes, electro-static discharge (ESD) protection diodes) that are connected to the conductors will rectify the received signal into a DC bias. This DC bias can be detected and used to detect the presence of the electromagnetic field 406.

In other embodiments, one or more peripheral devices may interface with the mobile device 420 to detect the electromagnetic field 406. Standalone detectors (i.e., that are not dependent on the mobile device 420) may also be used to detect the electromagnetic field 406.

Figure 5A:
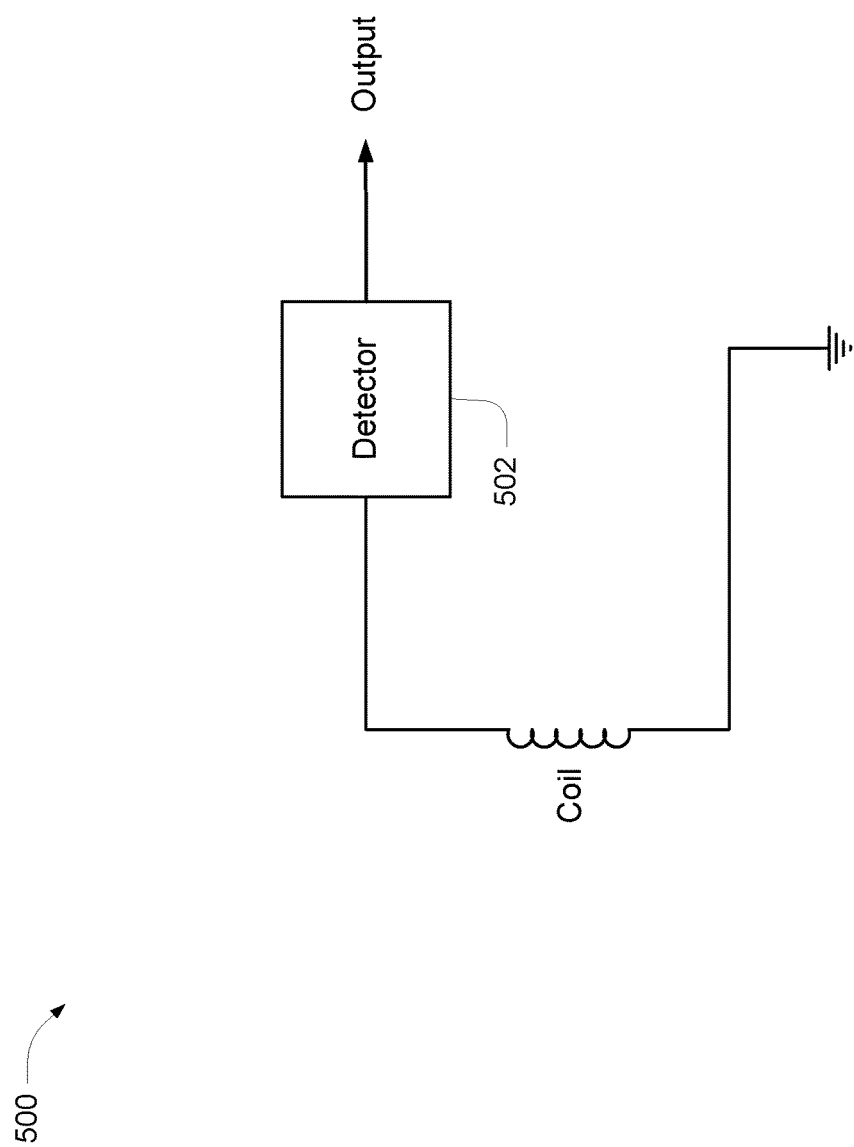
FIGS. 5A-5D are example field detection warning circuits.

Referring to FIGS. 5A-5D, examples of an apparatus for alerting a user of the presence of a magnetic field are shown. FIG. 5A depicts a first example circuit 500 including a detection coil and a detector circuit 502. The first example circuit 500 may be included in a mobile device 420. In general, a mobile device includes electronic devices such as personal electronic device 414 and IMD 412, or other types of portable devices which may be disposed on or about a pedestrian. The detection coil and the detector circuit 502 are an example of a magnetic flux sensor configured to provide an output based on detecting the magnet flux generated by a WEVC system. In an example, the detection coil and detector circuit 502 may be configured to form a resonant circuit (e.g., capacitor not shown) based on the expected frequencies of a WEVC system (e.g., 85 kHz). The detection coil and detector circuit 502 may be other magnetic flux sensors such as NFC and resonant charging coils (e.g., at the resonant frequency or at another frequency— e.g., configured also in a mode as a resonator at another frequency), or Hall Effect sensors configured to detect a current or voltage across the detection coil. The detector circuit 502 is configured to provide an output based on the current or voltage on the detection coil. The detector circuit 502 may receive power from an external power source (e.g., battery) or it may be configured to utilize the current generated in the detection coil to output a control signal (e.g., the first example circuit 500 may be self-powered). The output may be received by one more other systems within a mobile device such as a notification system configured to provide audible and visual alerts to a user, and/or a radio message via a radio communication system such as WiFi or Bluetooth which are configured to communicate with other devices. The output is an indication that a magnetic flux is present.

Figure 5B:
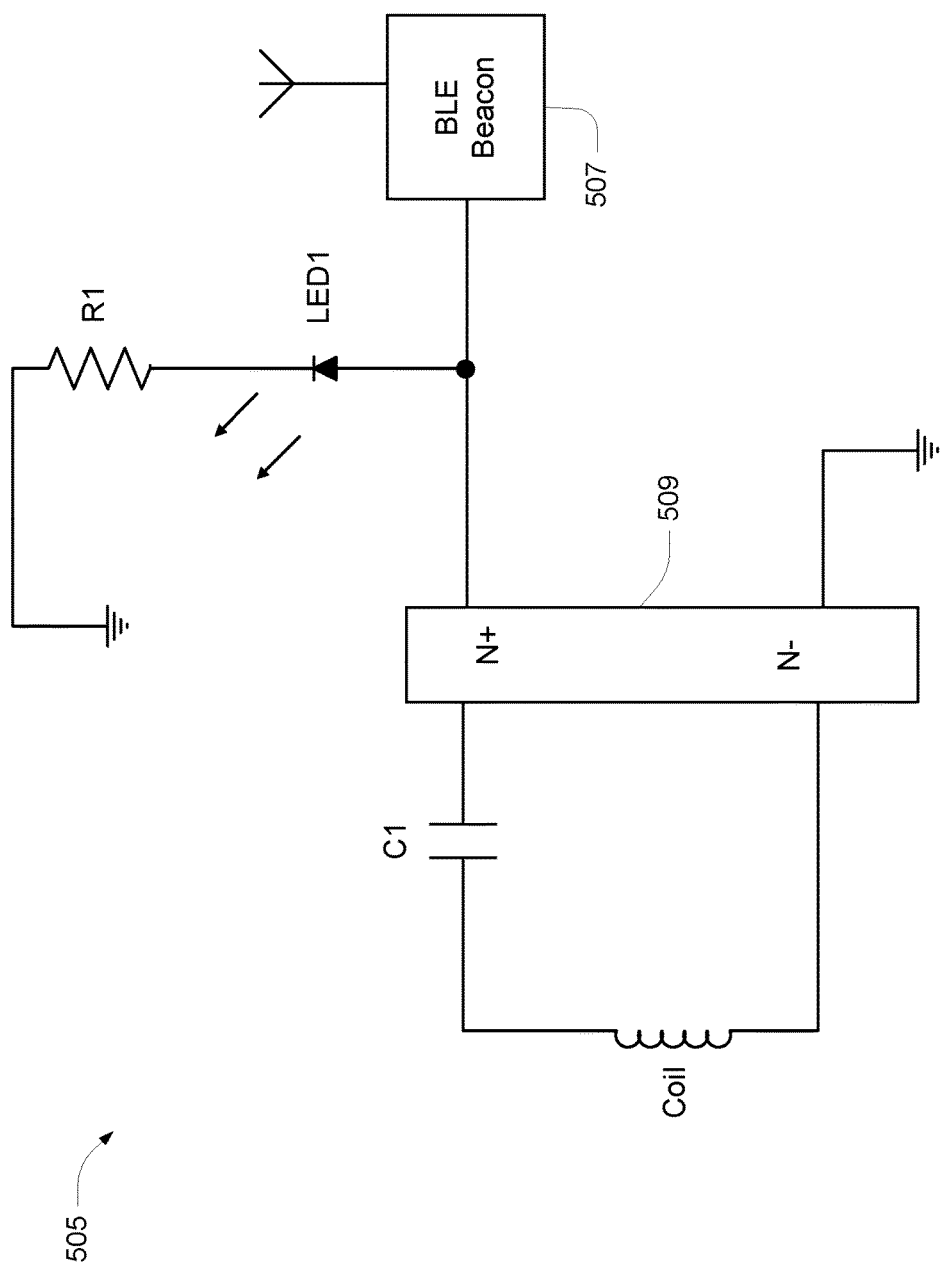

Referring to FIG. 5B, an example of a field detection warning circuit is shown. A second example circuit 505 includes at least one detection coil, a capacitor C1, a rectifier circuit 509, a light emitting diode warning light LED1, a resistor R1, and a BLUETOOTH Low Energy (BLE) beacon 507. The coil and the capacitor C1 form a series resonant circuit based on the frequency standards for WEVC systems (i.e., designed to resonate at WEVC operating frequencies such as for example those in the kHz range—e.g., 70-120 kHz). Since the WEVC field contains significant power, the second example circuit 505 may be self-powered. The received signal powers both the warning light LED and a BLE beacon 507 that may be configured to transmit a warning beacon. The BLE signal may be picked up by proximate devices (e.g., a mobile device 420) to provide a general warning indicating a proximate electromagnetic field. Multiple coils may be used and configured to detect a relative direction of the electromagnetic field, and the warning lights may be configured to indicate the relative direction. The second example circuit 505 may be used in a method of detecting an active base charging pad in a wireless electric vehicle charging system. In an embodiment, the second example circuit 505 may be disposed in an article of clothing to be worn by a user, or in other wearable accessories, and the BLE signal may be configured to cause the proximate WEVC to shut down if the detected power level exceeds a safe threshold. For example, a detector located in a user's shoe may be configured detect when a user's feet are too close to a WEVC generated electromagnetic field as the user approaches an electric vehicle. The base charging communication system 372 may be used to communicate with the BLE beacon 507 and receive an alert message. The base charging system controller 342 may be configured to change the state of the charging coils based on messages received via the base charging communication system 372.

Figure 5C:
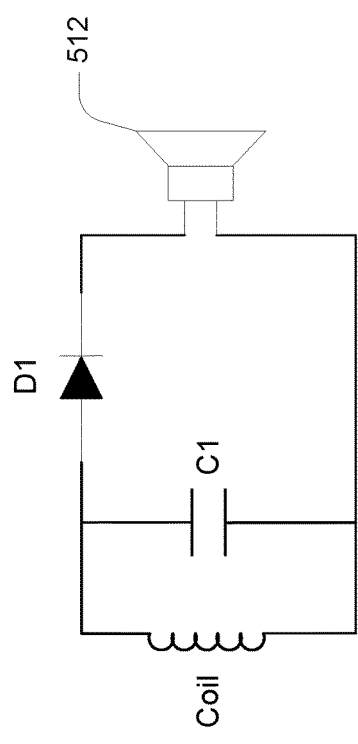
Figure 5D:
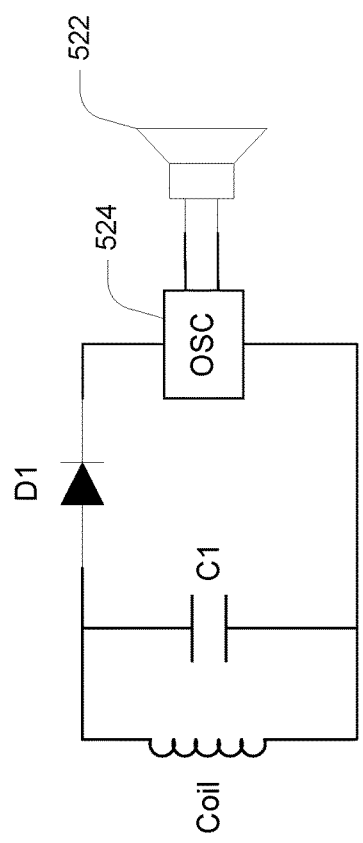

Referring to FIGS. 5B and 5C, a third example field detection warning circuit 510, and a fourth example field detection warning circuit 520 are shown. The third example circuit 510 includes a coil and a capacitor C1 to form a resonant circuit based on the WEVC charging frequency (e.g., approximately 85 kHz). A diode D1, or other rectification components, may be used to partially rectify a signal and a speaker 512 may be used to emit a tone. In operation, a WEVC station may be configured to modulate the emitted power field with a shallow (e.g., <10%) modulation at an audible frequency such as 5 KHz. The frequency or modulation can be varied to provide an identification value for the WEVC. The speaker 512 emits a tone based on the modulated frequency in the WEVC station, and at an amplitude relative to the detected field strength. The third example circuit 510 provides a relatively low cost and self-powered method for providing an audible warning regarding a proximate electromagnetic field. The fourth example circuit 520 may also be used to provide an audible warning. The fourth example circuit 520 utilizes an oscillator 524 to drive a speaker 522. The configuration of the oscillator 524 may be used to eliminate the requirement for the modulation of the WEVC signal as previously described. In a pet collar use case, the oscillator 524 may be configured to emit a high pitch sound to prompt an animal to move away from the field.

Figure 6A:
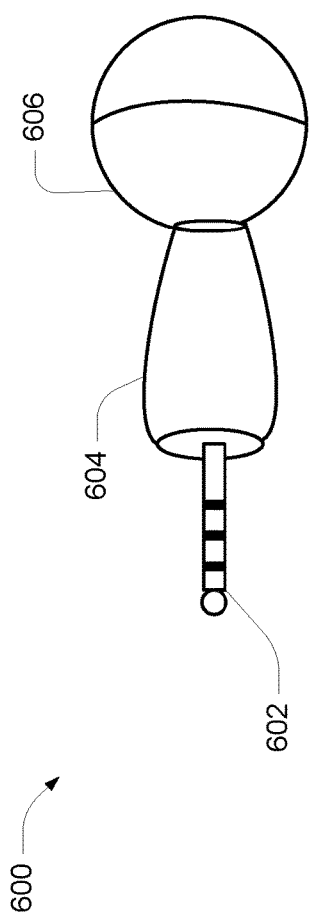
FIGS. 6A and 6B are an example peripheral field detection device with a sense coil.
Figure 6B:
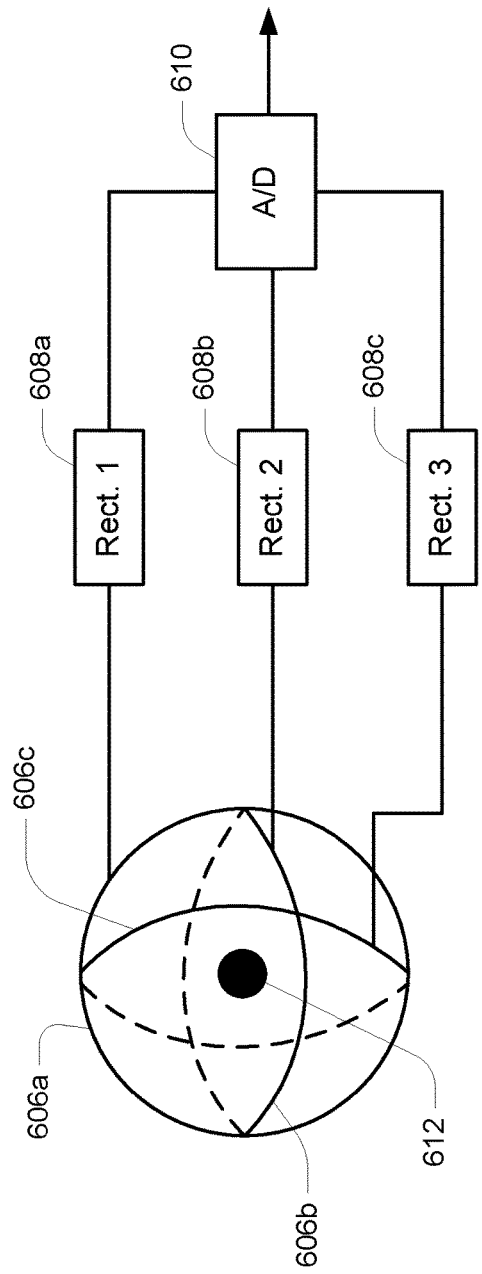

Referring to FIGS. 6A and 6B, an example peripheral field detection device 600 with a sense coil is shown. While the embedded sensors in a mobile device (e.g., resonant charging coils, NFC coils, magnetometers, Hall Effect sensors) may be used to detect magnetic fields from a WEVC system, another option is to provide an external peripheral sensor for use with a mobile device. The external peripheral may be operably coupled to the mobile device and configured to detect charging signals (e.g., electromagnetic fields) to enable the mobile device to provide warnings to users and/or gather near-real time information about the electromagnetic fields generated by WEVC systems. In an embodiment, the field detection device 600 includes an audio jack 602, a circuit housing 604, and a sense coil 606. The audio jack 602 may be a 3.5 mm multi-ring connector configured to communicate with a mobile device via the microphone/headphone port. The audio jack 602 is exemplary only as other connectors such as universal serial bus port (USB, USB-C), FIREWIRE, LIGHTNING, etc. may be used to operably couple the field detection device 600 to a mobile device. The sense coil 606 may include at least one magnetic flux sensor such as one or more loops configured to detect a magnetic field based on the relative orientation between the sense coil 606 and the magnetic field. The loops may include one or more tuning elements (e.g. variable capacitors, varactor) configured to create a resonant circuit at the frequency of a WEVC system. A 3D sense coil may be configured with plurality of loops at different orientations. For example, as depicted in FIG. 6B, three sense loops 606a-c may be oriented perpendicular to one another such that a magnetic field may be detected from any angle. In this orientation, any magnetic field will induce a voltage in at least one of the sense loops 606a-c. These voltages may be rectified via one or more rectifiers 608a-c and converted to a digital form via an analog-to-digital (A/D) converter 610. Due to the low voltages, the rectifiers 608a-c may be active circuits. The rectifiers 608a-c and the A/D converter 610 may be disposed within the circuit housing 604. An optional ferrite pit 612 may be disposed in the center of the sense loops 606a-c to increase the sensitivity of the loops. The direction of the magnetic field as detected by the sense coil 606 may be used in conjunction with navigational variables (e.g., magnetic compass application, line-of-advance, dead reckoning) determined by the mobile device to compute a bearing to the magnetic field. The bearing information may be provided to the user via a notification mechanism such as a display device (e.g., touch screen, liquid crystal display), light panel, audible alarm, or other notification device. The bearing information may also be transmitted to a location server and disseminated to other mobile devices in the local area.

Figure 7:
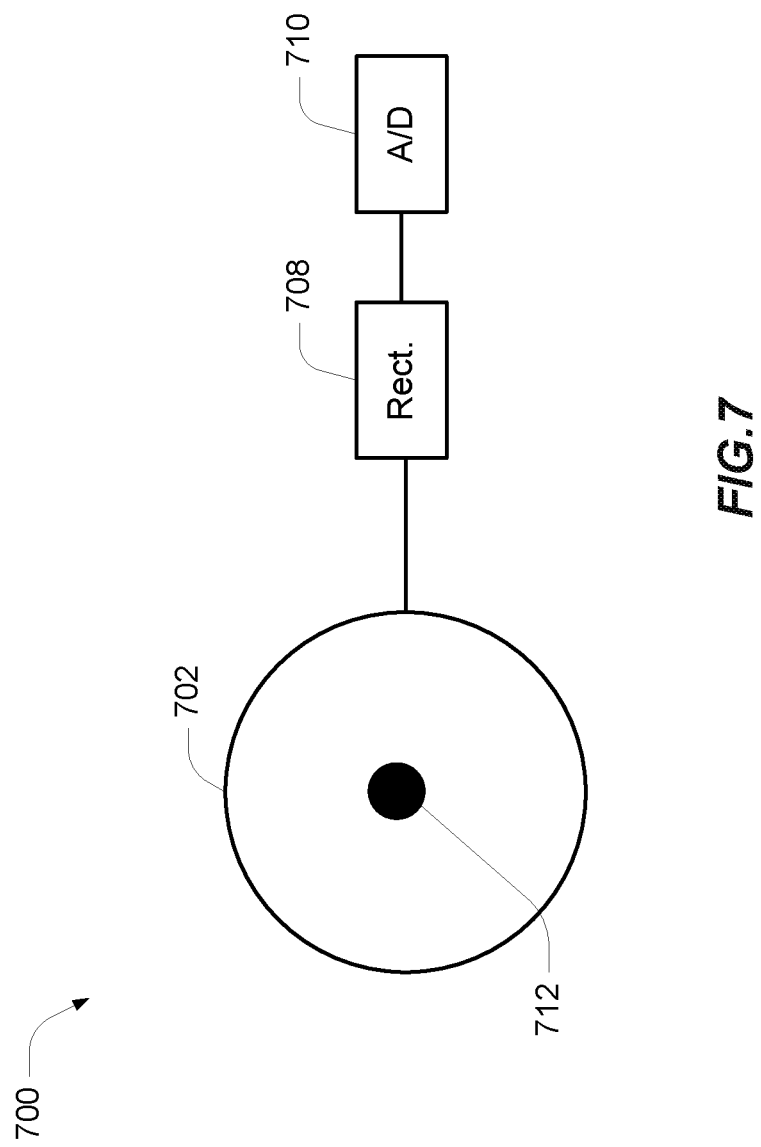
FIG. 7 is an example field detection device with a single sense coil.

Referring to FIG. 7, an example field detection device 700 with a single sense coil 702 is shown. The configuration of the single coil 702 provides directional sensitivity to the device. In operation, the orientation of the single coil 702 may be varied and the strength of the induced voltage through a rectifier 708 and an A/D converter 710 can be measured. In an example, a mobile device may emit an audible tone based on the level of the induced voltage and a user may manually direct the first coil to determine a bearing to the source of the detected electromagnetic signal. In an example, the mobile device may present a visual display to a user via a display or with other light emitting device (e.g., LED, flash, key board lights). The mobile device may be configured to send an electronic signal (e.g., WiFi, BLE) to another electronic device based on the level of induced voltage. Other signal strength indicators may also be used. In general, the induced voltage in an open loop is at a maximum when the signal source is orthogonal to plane of the loop. A ferrite 712 may be disposed at the center of the coil 702 to increase sensitivity. The single sense coil 702 may be integrated within a mobile device (e.g., on a back cover of a smartphone), and the mobile device may be configured to measure and record the induced voltage in the coil in conjunction with the current orientation of the mobile device. For example, the mobile device may be configured to determine a bearing to the electromagnetic signal based on the compass heading (or line of advance) when the induced voltage in the coil is at a maximum.

Referring to FIGS. 8A and 8B, block diagrams of flux sensors configured as peripheral devices are shown. A USB device 800 includes a USB connector 802, a 5 volt power output pipe 804, a USB endpoint controller 806, and a flux sensor 808. The USB connector 802 may be a USB On-The-Go (OTG), micro-USB, mini-USB, USB C, or similar connectors to support a master/slave architecture. The 5 volt power output pipe 804 may be configured to provide power to the flux sensor 808. For example, the flux sensor 808 may include one or more sensing loops such as depicted in FIG. 6B with one or more active rectifiers (e.g., with actively controlled MOSFET switches) and an A/D converter. The 5 volt power output pipe 804 may be used to power the active rectifiers, A/D converters, or other components in the flux sensor 808. The endpoint controller 806 is configured to transfer digital signals between the flux sensor 808 and a mobile device through the connector 802. In operation, the endpoint controller 806 may receive data from the flux sensor 808 and format the data to be sent via a USB bus.

An audio plug device 810 may include an audio plug 812, an energy harvest module 814, a modem 816, and a flux sensor 818. The audio plug device 810 may be used in conjunction with an application executing on a mobile device, such that application causes the mobile device to generate a max-volume 1 kHz square wave at an earphone connection. The energy harvest module 814 is configured to rectify the 1 kHz signal and output power, which may be used by the flux sensor 818. For example, the output power may be in the range of a few tens of mW and may be used to power the flux sensor 818 (e.g., active rectifiers, A/D converters). The data output from the flux sensor 818 may be used modulate audio in the modem 816. For example, the modem 816 may be configured to modulate the audio via a standard telephone modem scheme (e.g., Bell 103A, Bell 212 or equivalent). The modulated audio is then sent over the microphone line and received by the mobile device via the audio plug 812. An application executing on the mobile device may be configured to decode the modem tones to reconstruct the data from the sensor.

In an embodiment, the flux sensors 808, 818 may be configured to detect variation in the electromagnetic field to uniquely identify a NFC protocol, a WEVC system manufacturer, of a particular charging unit. The variations in the electromagnetic field may be caused by modulation of the charging field (e.g., such as used in an in-band signaling scheme), power adjustment techniques, or other characteristics of the electromagnetic field.

Figure 9:
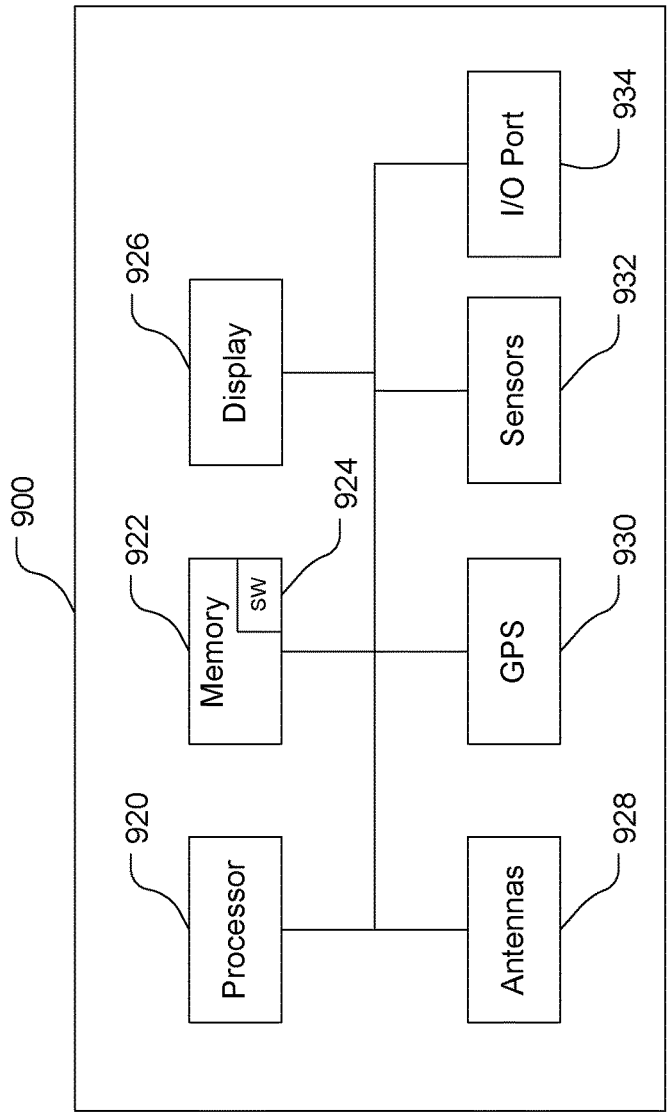
FIG. 9 is a block diagram of a mobile device.

Referring also to FIG. 9, a block diagram of an example mobile device 900 is shown. The mobile device 900 may be may be a smart phone, tablet, sports band, shoe-based pedometer, pet collar, or other devices that may be worn or transported by a user. In an example, mobile device 900 may be an implanted medical device. In general, a mobile device 900 may include one or more components of a computer system such as a processor 920, memory 922 including software 924, a display device 926, antennas 928, a positioning module 930, orientation sensors 932, and an input/output port 934. The antennas 928 include one or more transceivers configured to communicate bi-directionally via one or more protocols such as BLUETOOTH, WiFi, and long-term evolution (LTE) radio. In an example, the antennas 928 may include one or more receiving coils and NFC antennas for wireless charging applications. The mobile device 900 may be configured to utilize the antennas 928 and/or orientation sensors 932 to detect the presence of charging fields at WEVC frequencies (e.g., a particular frequency or adapted to detect a range of frequencies that are associated with vehicle charging). In an example, the orientation sensors 932 may include flux sensors or other magnetic fields configured to detect WEVC charging fields. The processor 920 is preferably an intelligent hardware device, e.g., a central processing unit (CPU) such as those made by ARM®, Intel® Corporation, or AMD®, a microcontroller, an application specific integrated circuit (ASIC), etc. The processor 920 could comprise multiple separate physical entities that can be distributed in the mobile device 900. The memory 922 includes random access memory (RAM) and read-only memory (ROM). The memory 922 stores the software 924 which is computer-readable, computer-executable software code containing instructions that are configured to, when executed, cause the processor 920 to perform various functions described herein. Alternatively, the software 924 may not be directly executable by the processor 920 but is configured to cause the computer, e.g., when compiled and executed, to perform the functions.

The positioning module 930 includes appropriate equipment for determining a current position of the mobile device 900. For example the positioning module may be based on terrestrial positioning techniques. The positioning module may be configured for monitoring GPS signals from satellites and determining position of the mobile device 900. For example, the positioning module 930 includes one or more GPS antennas, and can either communicate with the processor 920 to determine location information or can use its own processor for processing the received GPS signals to determine the location of the mobile device 900. Further, the positioning module 930 can communicate with other entities such as a location server or other location determination entity in order to send and/or receive assistance information for use in determining the location of the mobile device 900.

The mobile device 900 may include one or more orientation sensors 932 such as a gyroscope, accelerometers, magnetometers (e.g., as used in a compass application), and a barometer. The orientation sensors 932 may operate in conjunction with the positioning module 930 to determine dead reckoning position estimates such as a line of advance and a DR location. The orientation sensors 932 may include one or more Hall Effect sensors configured to detect the presence of magnetic flux radiating from a WEVC charging system. The mobile device 900 may also include one or more I/O ports 934 (i.e., communication ports) such as a serial communication port, parallel communication port, and/or other standard interface ports such as USB (mini-USB, micro-USB, USB OTG), LIGHTNING, or other proprietary connection configurations. Other examples of mobile devices, however, may not include all of the components included in the mobile device 900. For example, an IMD may only include a processor 920, memory 922 and antennas 928 for communication and wireless charging. Still other examples/configurations are possible and the examples provided are not a complete or exhaustive list of possibilities.

Figure 10:
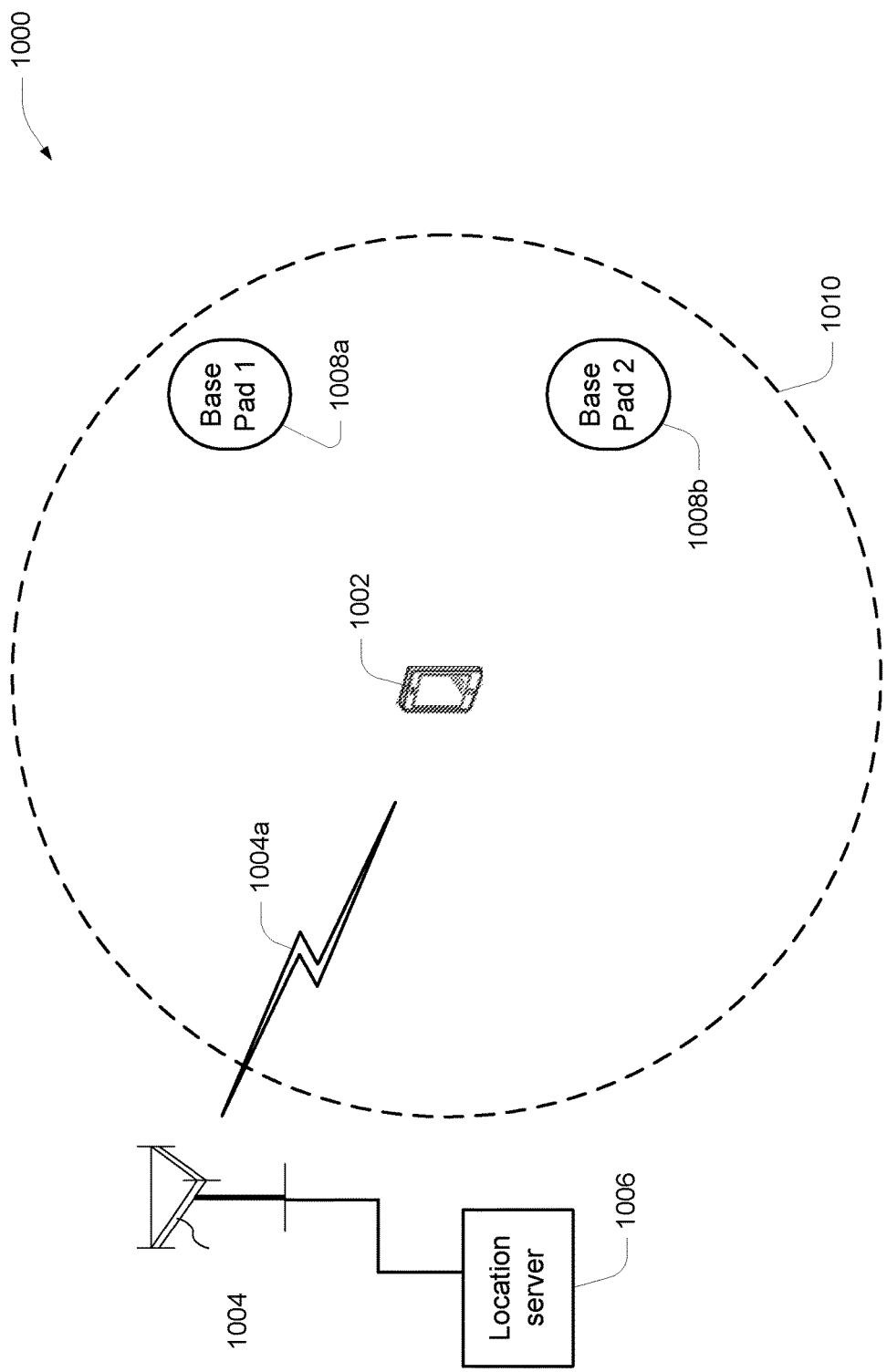
FIG. 10 is an illustration of a use case for location based detection of electromagnetic fields.

Referring to FIG. 10, an illustration of a use case 1000 for location based detection of electromagnetic fields is shown. The use case 1000 includes a mobile device 1002 and a base station 1004. The mobile device 1002 is an example of the mobile device 900 in FIG. 9, and may include an internal or peripheral field detection device with one or more detection coils configured to detect proximate electromagnetic fields. The base station may be part of a cellular network, an access point in a wireless wide area network (WWAN), or other short-range radio messaging/wireless communication device such as a BLUETOOTH station. The mobile device 1002 is configured to communicate with the base station 1004 via a wireless link 1004a (e.g., with a transceiver in the mobile device). The base station 1004 may be operably coupled to a location server 1006 and configured to provide location based services to the mobile device 1002. The location server 1006 may include data associated with WEVC systems in a regional area. For example, the location server 1006 may include a data structure (e.g., relational database, flat files) with fields such as station identification, location, power rating, current status (e.g., charging, idle, inoperable, etc.), charging frequency, and other variables that may be associated with or identify a particular WEVC system. The WEVC information may be provided to the mobile device 1002 on a periodic basis, or based on other trigger conditions such the current location of the mobile device 1002. In operation, the mobile device 1002 may be configured active one or more magnetic flux sensors to detect an electromagnetic field when the mobile device 1002 is proximate to one or more potentially emitting base pads. For example, a range 1010 (e.g., 5 m, 10 m, 20 m, 100 m) may be established such that mobile device 1002 will actively sample for a signal on the detection coils when a WEVC base pad is within the range distance. In the use case 1000, a first base pad 1008a and a second base pad 1008b are within the range 1010.

The mobile device 1002 is configured to provide an alert based on signals on the detection coils. Assuming the first base pad 1008a is in an active charge mode, and emitting an electromagnetic field, the mobile device 1002 may provide an audible, tactile and/or visual indication to alert the user of the proximate electromagnetic field. The electromagnetic field may include a signal characteristic such as identification code (e.g., modulated in the field), or other identifying characteristic (e.g., frequency value), to identify the base pad or the WEVC system. The mobile device 1002 may be configured correlate the signal characteristic with the WEVC information received from the location server 1006. In an embodiment, the mobile device 1002 may be configured to determine a bearing to the active base pad based on the signals present on the detection coils and inform the user of the bearing. The mobile device 1002 may be configured to transmit detection results, including current location, signal characteristics, and bearing information to the location server. The location server 1006 may utilize the received detection results to update the current status of a particular base pad. For example, the location server 1006 may correlate the current location of the mobile device 1002 and the bearing information with location data in the WEVC information. The location server 1006 may be configured to disseminate the updated status to other mobile devices in the broadcast area to inform other users of a proximate electromagnetic field.

In an embodiment, the location server 1006 may be configured to communicate with a WEVC system via the base charging communication system 372 and remotely alter the charging operations of base pads within the WEVC system. For example, upon receipt of a detection result from the mobile device 1002, the location server 1006 may be configured to send a message to the WEVC system to reduce the power output of the detected base pad. The location server 1006 may then be configured to monitor the location of the mobile device 1002 and send a message to WEVC system to increase power to the base pad when the distance between the mobile device 1002 and the base pad exceeds an establish safety range.

Due to size and power limitation, an implanted medical device (IMD) may have limited ability to establish a communication link with an access point or a base station. In such a use case, the IMD may utilize a communication link 412a with the mobile device 420, and the mobile device may communicate with the location server 1006. For example, the IMD may detect an electromagnetic field emitted from a base pad via one or more detection coils, and provide an indication of the detection to a mobile device. The indication of detection may include any signal characteristics detected by the IMD. In an embodiment, the mobile device may be configured to detect a proximate electromagnetic field based on a state of an 1 MB. For example, an IMD may be more sensitive to external electromagnetic fields during certain states of operation (e.g., elevated heart rate, active pumping). The 1 MB may signal the mobile device via the communication link 412a when the IMD enters an electromagnetic sensitive state, and the mobile device may then actively scan for potential electromagnetic fields.

Figure 11:
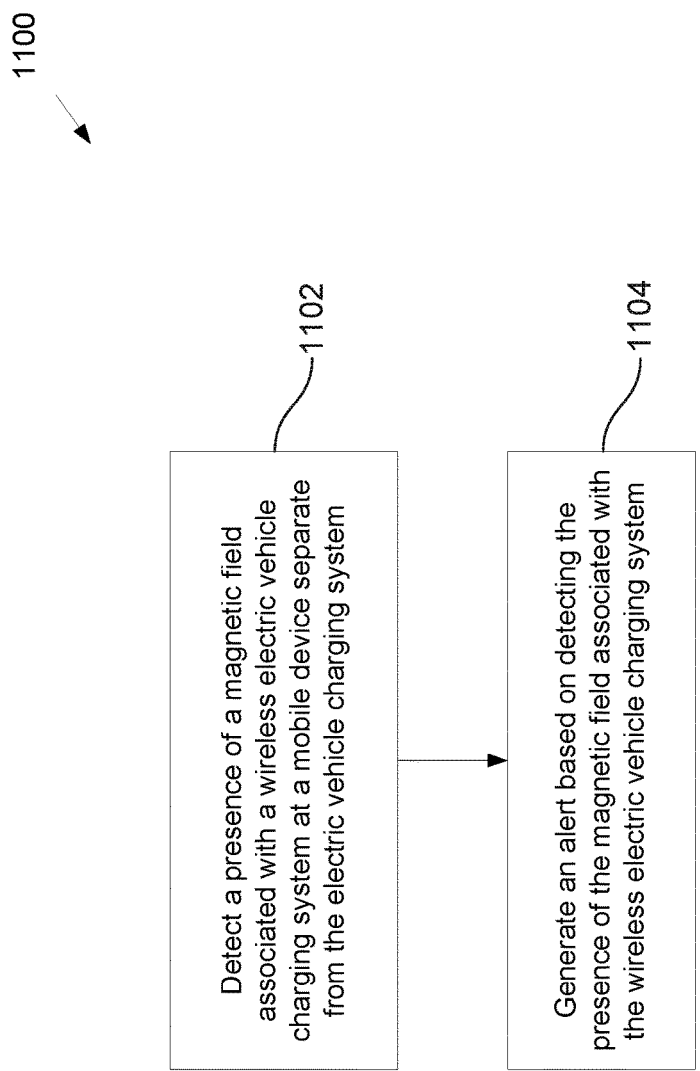
FIG. 11 is a process diagram for generating an alert based on a detected magnetic field.

Referring to FIG. 11, a method 1100 for generating an alert based on a detected magnetic field includes the stages shown. The method 1100, however, is exemplary only and not limiting. The method 1100 may be altered, e.g., by having stages added, removed, or rearranged.

At stage 1102, the method includes detecting a presence of a magnetic field associated with a wireless electric vehicle charging system at a mobile device separate from the electric vehicle charging system. A mobile device such as a smartphone, tablet, watch, fitness band, pet collar, IMD or field detector may include one or more coils configured to detect a proximate magnetic field. The electromagnetic field may be generated during charging operations in a WEVC system, such as the wireless power transfer system 300. The one or more coils may include inductive or resonant charging coils or NFC coils disposed within a mobile device. The one or more coils may be included in a peripheral device that is operationally coupled to the mobile device. The coils may be configured to resonate at the expected frequency for the electromagnetic field. For example, WEVC systems currently operate at frequencies around 70-120 kHz. Other frequencies may be used. In an example, other sensors within the mobile device, such as magnetometers, accelerometers, Hall Effect sensors may be configured to detect a magnetic field. Detecting the magnetic field may include measuring a signal on the one or more coils or sensors. For example, the magnetic field will induce a current in the one or more coils. The output voltage of a Hall Effect sensor/magnetometer will change in response to a magnetic field. The mobile device may utilize these signals to determine that a magnetic field is present. In an example, magnetometers, wireless power receivers and unintended receivers such as microphone preamplifiers may experience DC rectification, where conductors within the mobile device receive the fields, and then parasitic structures within the IC's they are connected to (e.g., body diodes, ESD protection diodes) rectify the signal into a DC bias. This DC bias may be used to detect WEVC fields.

In an example, detecting the presence of the magnetic field may include determining a field characteristic of the magnetic field. In an example, the mobile device may be configured to measure the signals induced on one or more coils by the detected magnetic field. A relative strength of the magnetic field may be determined based on the current induced in the coils. The field may be associated with a specific frequency (e.g., 84.7 kHz, 84.9 kHz, 85.3 kHz, etc.). The magnetic field may be modulated for use with in-band signaling, and may include characteristics such as an identification number. The mobile device may be configured to decode the modulated signal. Other parameters associated with the charge controller in a WEVC system may be detected from the magnetic field. For example, the results of pulse width modulation (PWM) and maximum power point tracking (MPPT) may be used to characterize the field. The detected field characteristics may be used to identify or classify the wireless charging system.

At stage 1104, the method includes generating an alert based on detecting the presence of the magnetic field associated with the wireless electric vehicle charging system. The mobile device may generate an audible tone, vibration, or visual indicator to alert the user based on the detection of the field. In an example, the alert may include using a base pad identification signal to generate a wireless alert message to instruct the base pad to reduce power or cease charging operations. For example, the mobile device may be configured to communicate with a WEVC system (e.g., the base charging communication system 372) via WiFi or BLUETOOTH and send one or more message to vary the state of the WEVC system based on a detected electromagnetic field. In an embodiment, the mobile device may utilize a field characteristic to access a database to determine the location and identification associated with the detected magnetic field. For example, the detected frequency may correspond to a single base pad within proximity to the current location of the mobile device. An alert may include displaying a map with the location of the emitting base pad.

Figure 12:
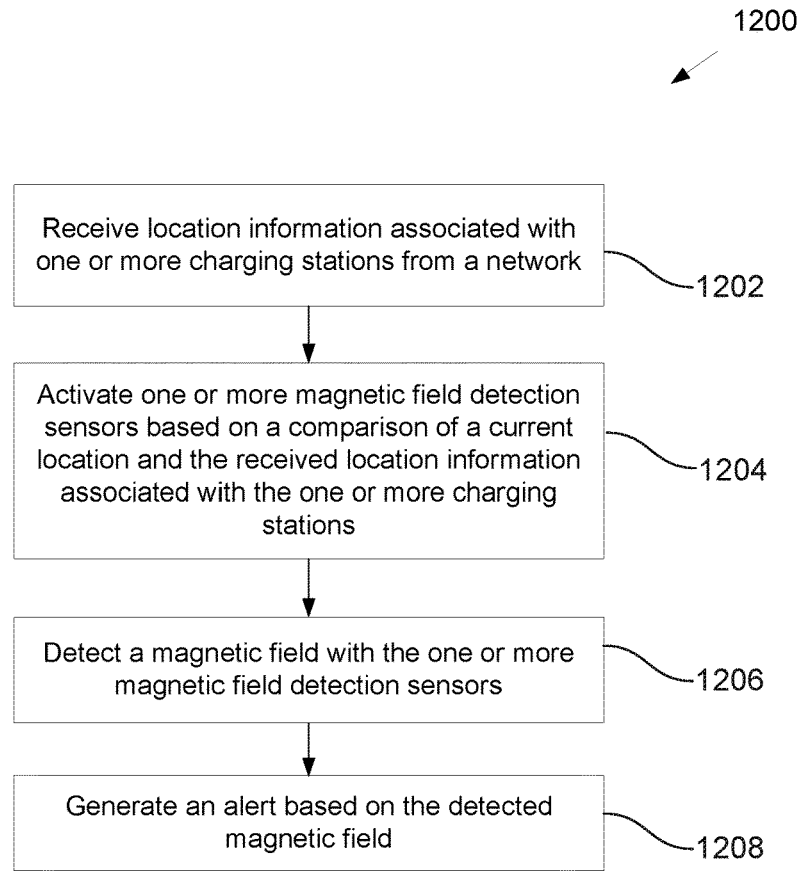
FIG. 12 is a process diagram for location based detection of a magnetic field.

Referring to FIG. 12, with further reference to FIG. 10, a method 1200 for location based detection of a magnetic field includes the stages shown. The method 1200, however, is exemplary only and not limiting. The method 1200 may be altered, e.g., by having stages added, removed, or rearranged.

At stage 1202, the method includes receiving location information associated with one or more charging stations from a network. A mobile device 1002 may be a means for receiving the location information from a wired or wireless network. In an example, the mobile device 1002 may be configured to communicate wirelessly with a wide area network using signals according to one or more protocols such as LTE, GSM, CDMA, or OFDM. The mobile device 1002 may be configured to communicate wirelessly with a local area network via short-range wireless communication techniques such as BLUETOOTH and Wi-Fi. The network may include a location server 1006 configured to store the location information associated with the one or more charging stations. The location server may be a computer system with a data structure containing one or more data fields associated with a WEVC base pad. For example, the data structure may include data fields to indicate the current state of a base pad (e.g., on, off, charging, idle, error, etc.) as well as other related information such as a base pad identification code, location, power rating, charging frequency, and other variables that may be associated with or identify a particular base pad in a WEVC system. The location information may be available to the mobile device 1002 via an application and updated on a periodic basis. In an embodiment, an IMD may be a means for receiving the location information. For example, the location information may be uploaded to a memory in the IMD during the manufacturing process or via a post-implant diagnostic process (e.g., software update). The location information may include beacon signal parameters which may be transmitted by the base charging communication system 372 in WEVC system via a radio message protocol such as BLUETOOTH or WiFi.

At stage 1204, the method includes activating one or more magnetic field detection sensors based on a comparison of a current location and the received location information associated with the one or more charging stations. The mobile device 1002 may include one or more antennas or sensors configured to detect an electromagnetic field. Internal wireless resonant charging coils or NFC coils may be used as a detection sensor. For example, a coil may be activated by sampling the coil for an induced voltage. Activating a coil may also include modifying one or more components (e.g., transcaps, variable capacitor, resistance, switches) in a tuning circuit to change the resonant frequency of the coil/tuning circuit. A peripheral sensor may be activated by sampling a signal received via an I/O port. Other sensors, such as magnetometers, may be sampled to detect a change in the expected signal when activated. In an embodiment, activating a magnetic field detection sensor may include measuring a DC bias on one or more circuits in a device. The current location of the mobile device 1002 may be based on GPS or other terrestrial positioning techniques (e.g., Received Signal Strength Indication (RSSI), Round Trip Time (RTT), Observed Time Difference of Arrival (OTDOA)). The current location of a device may be determined based on received beacon signals from the base charging communication system 372 (i.e., detecting the beacon is an indication the WEVC system is nearby). A mobile device may be configured to monitor the signals on internal or external coils or sensors when a potentially emitting base pad is within a predefined range 1010. Location based activation of the sense coils provides increased flexibility in device design in that existing coils may be utilized for their primary function (e.g., wireless power transfer, NFC), and then tuned (e.g., via a variable tuning circuit) to increase sensitivity to WEVC frequencies when a potential risk exists. Location based activation may also provide power savings in that active components in a peripheral detection sensor will not consume power until required.

At stage 1206, the method includes detecting a magnetic field with the one or more magnetic field detection sensors. Internal coils and sensors and external field detectors may be a means for detecting a magnetic field. Detecting the magnetic field may include measuring a voltage on the one or more coils or sensors. For example, the magnetic field will induce a current and voltage in the one or more coils. A peripheral sensing device may provide a signal via an I/O port such as a USB or audio jack. The output voltage of a Hall Effect sensor/magnetometer will change in response to a magnetic field. The voltage across wireless power receivers and unintended receivers such as microphone preamplifiers may be sampled to detect DC rectification. The mobile device 1002 may be configured to utilize one or more of these signals to determine that a magnetic field is present.

At stage 1208, the method includes generating an alert based on the detected magnetic field. A mobile device 1002 may be a means for generating an alert. The alert is primarily directed to notify the user of a proximate magnetic field but may also be used to provide feedback and control information to the WEVC via the base charging communication system 372. In an example, the mobile device may generate an audible tone, vibration, or visual indicator to alert the user based on the strength of the field. A base pad identification signal may be used by the mobile device to generate a wireless alert message to instruct the base pad to reduce power or cease charging operations. For example, the mobile device may be configured to communicate with the base charging communication system 372 via WiFi or BLUETOOTH and send one or more message to vary the state of the WEVC system based on a detected electromagnetic field. In an embodiment, the alert may be a broadcast message configured to instruct a receiving WEVC system to shut down (or reduce power to) one or more base pads. The broadcast message may include a base pad identification code (e.g., such as received with the location information, or as decoded from the magnetic field).

In an embodiment, the mobile device 1002 may be configured to determine a bearing to a base pad based on the detected magnetic field. For example, a peripheral 3D field detection device 600 may be used to determine a bearing to the source of a magnetic field. A single loop detector may also be used to determine a bearing based on movement of the loop by the user or other means. The bearing information may be stored by a mobile device and provided to a remote server with a current location. Other characteristics of the magnetic field, such as strength and frequency, may also be provided to a remote server. The server may be configured to collect such information from multiple devices over time and generate an expected heat map for a base station. The resulting heat map data may be used to modify the size and shape of the range area 1010, which may be used to activate a magnetic field detection sensor at stage 1204. The detection feedback may also be used to provide near-real time updates to other mobile devices in an area.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory processor-readable storage medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, including in the claims, unless otherwise stated, a statement that a function or operation is "based on" an item or condition means that the function or operation is based on the stated item or condition and may be based on one or more items and/or conditions in addition to the stated item or condition.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for alerting a user of the presence of a magnetic field, comprising:
   a mobile device including a charging system configured to receive wireless power for charging the mobile device; and
   at least one coil in the charging system configured as a magnetic flux sensor to detect the presence of the magnetic field associated with a wireless electric vehicle charging system, the mobile device configured to generate an alert based on the presence of the magnetic field detected by the at least one magnetic flux sensor.

2. The apparatus of claim 1 wherein the at least one magnetic flux sensor is configured to detect the presence of the magnetic field based on a frequency associated with the wireless electric vehicle charging system.

3. The apparatus of claim 2 wherein the frequency associated with the wireless electric vehicle charging system is in a range of 70-120 kHz.

4. The apparatus of claim 1 wherein the mobile device is an implantable medical device.

5. The apparatus of claim 1 wherein the mobile device includes a display device configured to provide an indication based on the alert.

6. The apparatus of claim 1 wherein the mobile device includes a speaker and the alert includes generating an audible alarm with the speaker.

7. The apparatus of claim 1 wherein the mobile device includes a transceiver and the alert includes transmitting a radio message via a radio message protocol with the transceiver.

8. The apparatus of claim 7 wherein the radio message is configured to cause the wireless electric vehicle charging system to reduce the magnetic field detected by the at least one magnetic flux sensor.

9. The apparatus of claim 1 wherein the at least one coil includes a plurality of loops configured to determine the presence of the magnetic field regardless of an orientation of the at least one coil relative to an orientation of the magnetic field.

10. The apparatus of claim 9 wherein the at least one coil is configured to determine a bearing to a source of the magnetic field based the plurality of loops.

11. The apparatus of claim 1 wherein the mobile device includes a positioning module configured to determine a current position of the mobile device, the mobile device being configured to activate the at least one magnetic flux sensor based on the current position of the mobile device.

12. The apparatus of claim 1 wherein the mobile device is a smartphone.

13. A method of detecting an active base charging pad in a wireless electric vehicle charging system, comprising:
    detecting a presence of a magnetic field associated with the wireless electric vehicle charging system at a resonant charging coil in a mobile device separate from the wireless electric vehicle charging system; and
    generating an alert based on detecting the presence of the magnetic field associated with the wireless electric vehicle charging system.

14. The method of claim 13 wherein detecting the magnetic field includes measuring a signal on a resonant charging coil in an implantable medical device.

15. The method of claim 13 further comprising determining a field characteristic of the magnetic field.

16. The method of claim 15 wherein determining the field characteristic of the magnetic field includes determining a strength of the magnetic field.

17. The method of claim 15 wherein determining the field characteristic of the magnetic field includes determining a frequency of the magnetic field.

18. The method of claim 15 wherein determining the field characteristic of the magnetic field includes determining an identification value based on an in-band signal modulated with the magnetic field.

19. The method of claim 13 wherein generating the alert includes transmitting a radio message to the wireless electric vehicle charging system via a radio message protocol.

20. The method of claim 15 further comprising:
    receiving location information associated with the wireless electric vehicle charging system from a location server; and
    providing the field characteristic to the location server.

21. An apparatus for detecting an active base charging pad in a wireless electric vehicle charging system, comprising:
    an implanted medical device configured to perform a medical function within a user and including:
        a resonant circuit including at least one detection coil configured to resonate at a frequency of a magnetic field associated with the wireless electric vehicle charging system;
        a rectifier circuit operably coupled to the at least one detection coil; and
        a transmitter operably coupled to the rectifier circuit and configured to transmit a radio message based on a voltage across the at least one detection coil;
    a personal electronic device configured to be worn or carried by the user and including:
        a transceiver configured to receive the radio message; and
        at least one processor operably coupled to the transceiver and configured to provide a warning to the user based on the radio message.

22. An apparatus for alerting a user of the presence of a magnetic field, comprising:
    a mobile device including a charging system configured to receive wireless power for charging the mobile device; and
    at least one near field communication coil in the charging system configured to detect the presence of the magnetic field associated with a wireless electric vehicle charging system, the mobile device configured to generate an alert based on the presence of the magnetic field detected by the near field communication coil.

23. The apparatus of claim 22 wherein the at least near field communication coil is configured to detect the presence of the magnetic field based on a frequency associated with the wireless electric vehicle charging system.

24. The apparatus of claim 23 wherein the frequency associated with the wireless electric vehicle charging system is in a range of 70-120 kHz.

* * * * *